(12) United States Patent
Nakazato

(10) Patent No.: US 8,244,570 B2
(45) Date of Patent: Aug. 14, 2012

(54) BUSINESS FLOW ANALYSIS METHOD AND APPARATUS

(75) Inventor: Katsuhisa Nakazato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/987,570

(22) Filed: Jan. 10, 2011

(65) Prior Publication Data

US 2011/0106577 A1    May 5, 2011

Related U.S. Application Data

(63) Continuation of application No. PCT/JP2008/062561, filed on Jul. 11, 2008.

(51) Int. Cl.
   *G06Q 10/00*    (2012.01)
(52) U.S. Cl. .................................... 705/7.27
(58) Field of Classification Search ............... 705/7.27
   See application file for complete search history.

(56) References Cited

U.S. PATENT DOCUMENTS

| | | | |
|---|---|---|---|
| 6,198,980 B1 * | 3/2001 | Costanza | 700/99 |
| 6,631,305 B2 * | 10/2003 | Newmark | 700/110 |
| 6,922,600 B1 * | 7/2005 | Conrad et al. | 700/108 |
| 7,379,782 B1 * | 5/2008 | Cocco | 700/103 |
| 7,415,421 B2 * | 8/2008 | Tu et al. | 705/7.19 |
| 7,818,351 B2 | 10/2010 | Nomura et al. | |
| 2002/0026257 A1 * | 2/2002 | Newmark | 700/108 |
| 2003/0171972 A1 * | 9/2003 | Heskin | 705/9 |
| 2005/0065830 A1 * | 3/2005 | Duke et al. | 705/7 |
| 2005/0076059 A1 | 4/2005 | Nomura et al. | |
| 2008/0195433 A1 * | 8/2008 | Glenn et al. | 705/7 |
| 2009/0177610 A1 | 7/2009 | Kawamura et al. | |
| 2010/0005469 A1 * | 1/2010 | Bose et al. | 718/102 |

FOREIGN PATENT DOCUMENTS

| | | |
|---|---|---|
| JP | 2-36036 | 2/1990 |
| JP | 7-141426 | 6/1995 |
| JP | 2004-355095 | 12/2004 |
| JP | 2006-236125 | 9/2006 |
| JP | 2007-4414 | 1/2007 |
| JP | 2007-279861 | 10/2007 |
| JP | 2007-334408 | 12/2007 |
| JP | 2008-117127 | 5/2008 |

OTHER PUBLICATIONS

Gur Mosheiov, "Minimizing Total Completion Time and Total Deviation of Job Completion Times from a Restrictive Due-Date," 165 European Journal of Operational Research 20-33 (2005).*
International Search Report for PCT/JP2008/062561 mailed Aug. 26, 2008.

* cited by examiner

*Primary Examiner* — Jonathan G Sterrett
*Assistant Examiner* — Neil Kardos
(74) *Attorney, Agent, or Firm* — Staas & Halsey LLP

(57) ABSTRACT

A series of transaction records is extracted for each case from a database storing processing results of respective performed jobs to generate, for each case, a process instance including job names and time data of the performed jobs arranged in a time series. Then, process instances satisfying a designated condition are classified among the process instances to calculate, for each classification, an average value and standard deviation of transition periods that are differences between a start time and an end time of a job section to be processed in the pertinent process instances. By identifying a process instance, which has correlation with the route before the job section and for which the reduction of the transition period is expected and/or a process instance, which has correlation with the entire route and for which the reduction of the transition period is expected, an improvement candidate is automatically shown to the user.

3 Claims, 15 Drawing Sheets

| IDENTIFIER | PROCESS TYPE | PROCESSING TIME |
|---|---|---|
| ID001 ★ | PROCESS A | 2007/01/10 13:11:36 |
| ID002 | PROCESS A | 2007/01/12 17:39:29 |
| ⋮ | ⋮ | ⋮ |

FIG.6

| IDENTIFIER | PROCESS TYPE | PROCESSING TIME |
|---|---|---|
| ID001 ★ | PROCESS B | 2007/01/11 11:07:56 |
| ID002 | PROCESS B | 2007/01/13 10:23:02 |
| ⋮ | ⋮ | ⋮ |

FIG.7

| IDENTIFIER | PROCESS TYPE | PROCESSING TIME |
|---|---|---|
| ID001 ★ | PROCESS C | 2007/01/11 12:09:47 |
| ID001 ★ | PROCESS D | 2007/01/12 19:58:13 |
| ID003 | PROCESS C | 2007/01/13 12:16:12 |
| ⋮ | ⋮ | ⋮ |

FIG.8A

| IDENTIFIER | PROCESS TYPE | PROCESSING TIME |
|---|---|---|
| ID001 | PROCESS A | 2007/01/10 13:11:36 |
| ID001 | PROCESS B | 2007/01/11 11:07:56 |
| ID001 | PROCESS C | 2007/01/11 12:09:47 |
| ID001 | PROCESS D | 2007/01/12 19:58:13 |

FIG.8B

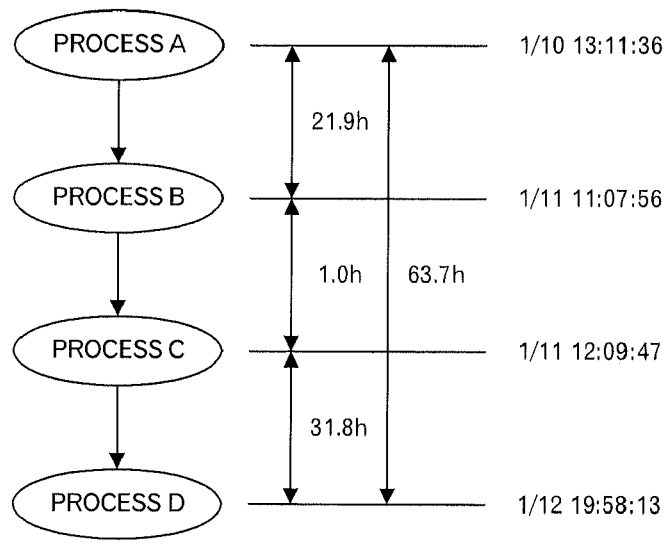

FIG.9

[ROUTE:TOTAL 4 TYPES]
1) STANDARD SPECIFICATION CAR→BODY ASSEMBLY→BODY ASSEMBLY CHECK
   →BODY PAINTING→ENGINE JOINING→OPTION
2) SPECIAL SPECIFICATION CAR→BODY ASSEMBLY→BODY ASSEMBLY CHECK
   →BODY PAINTING→ENGINE JOINING→OPTION
3) SPECIAL SPECIFICATION CAR→BODY ASSEMBLY→BODY ASSEMBLY CHECK
   →BODY PAINTING→ENGINE JOINING→NO OPTION
4) STANDARD SPECIFICATION CAR→BODY ASSEMBLY→BODY ASSEMBLY CHECK
   →BODY PAINTING→ENGINE JOINING→NO OPTION

FIG.10

1) STANDARD SPECIFICATION CAR→BODY ASSEMBLY→BODY ASSEMBLY CHECK
→BODY PAINTING→ENGINE JOINING→OPTION
4) STANDARD SPECIFICATION CAR→BODY ASSEMBLY→BODY ASSEMBLY CHECK
→BODY PAINTING→ENGINE JOINING→NO OPTION

A-1)"STANDARD SPECIFICATION CAR"
A-2)"STANDARD SPECIFICATION CAR→BODY ASSEMBLY"
B-1)"SPECIAL SPECIFICATION CAR"
B-2)"SPECIAL SPECIFICATION CAR→BODY ASSEMBLY"

FIG.18

PROCESSING SECTION:BODY ASSEMBLY→BODY ASSEMBLY CHECK
CONSTRAINT CONDITION:NONE

A-1)"STANDARD SPECIFICATION CAR"
    A-2)"STANDARD SPECIFICATION CAR→BODY ASSEMBLY"
    B-1)"SPECIAL SPECIFICATION CAR"
    B-2)"SPECIAL SPECIFICATION CAR→BODY ASSEMBLY"

IMPROVEMENT EFFECT:0.9h

FIG.19

1) BODY ASSEMBLY→BODY ASSEMBLY CHECK→BODY PAINTING→ENGINE ASSEMBLY→ENGINE ASSEMBLY CHECK→JOINING →PARTS INSTALLATION→ENTIRE CHECK→SHIPPING(×15 TIMES)
2) BODY ASSEMBLY→BODY ASSEMBLY CHECK→BODY PAINTING→ENGINE ASSEMBLY→ENGINE ASSEMBLY CHECK→JOINING →PARTS INSTALLATION→OPTION INSTALLATION→ENTIRE CHECK→SHIPPING(×12 TIMES)
3) BODY ASSEMBLY→BODY ASSEMBLY CHECK→BODY PAINTING→ENGINE ASSEMBLY→ENGINE ASSEMBLY CHECK→JOINING →PARTS INSTALLATION→ENTIRE CHECK→REPAIR→ENTIRE CHECK→SHIPPING(×4 TIMES)
4) ENGINE ASSEMBLY→ENGINE ASSEMBLY CHECK→BODY ASSEMBLY→BODY ASSEMBLY CHECK→BODY PAINTING→JOINING →PARTS INSTALLATION→ENTIRE CHECK→SHIPPING(×13 TIMES)
5) ENGINE ASSEMBLY→ENGINE ASSEMBLY CHECK→BODY ASSEMBLY→BODY ASSEMBLY CHECK→BODY PAINTING→JOINING →PARTS INSTALLATION→OPTION INSTALLATION→ENTIRE CHECK→SHIPPING(×11 TIMES)
6) ENGINE ASSEMBLY→ENGINE ASSEMBLY CHECK→BODY ASSEMBLY→BODY ASSEMBLY CHECK→BODY PAINTING→JOINING →PARTS INSTALLATION→ENTIRE CHECK→REPAIR→ENTIRE CHECK→SHIPPING(×4 TIMES)

FIG.20

```
1) BODY ASSEMBLY→BODY ASSEMBLY CHECK→BODY PAINTING
   →ENGINE ASSEMBLY→ENGINE ASSEMBLY CHECK→JOINING
   →PARTS INSTALLATION→ENTIRE CHECK→SHIPPING
4) ENGINE ASSEMBLY→ENGINE ASSEMBLY CHECK→BODY ASSEMBLY
   →BODY ASSEMBLY CHECK→BODY PAINTING→JOINING→PARTS INSTALLATION
   →ENTIRE CHECK→SHIPPING
```

FIG.22

```
"BODY ASSEMBLY", "BODY ASSEMBLY CHECK", "BODY PAINTING",
"ENGINE ASSEMBLY", "ENGINE ASSEMBLY CHECK", "JOINING",
"PARTS INSTALLATION", "ENTIRE CHECK", "SHIPPING"
```

FIG.23

```
"BODY ASSEMBLY→BODY ASSEMBLY CHECK",
"BODY ASSEMBLY CHECK→BODY PAINTING",
"ENGINE ASSEMBLY→ENGINE ASSEMBLY CHECK",
"JOINING→PARTS INSTALLATION",
"PARTS INSTALLATION→ENTIRE CHECK",
"ENTIRE CHECK→SHIPPING"
```

FIG.24

```
2) BODY ASSEMBLY→BODY ASSEMBLY CHECK→BODY PAINTING→ENGINE ASSEMBLY
   →ENGINE ASSEMBLY CHECK→JOINING→PARTS INSTALLATION
   →OPTION INSTALLATION→ENTIRE CHECK→SHIPPING
3) BODY ASSEMBLY→BODY ASSEMBLY CHECK→BODY PAINTING→ENGINE ASSEMBLY
   →ENGINE ASSEMBLY CHECK→JOINING→PARTS INSTALLATION→ENTIRE CHECK
   →REPAIR→ENTIRE CHECK→SHIPPING
5) ENGINE ASSEMBLY→ENGINE ASSEMBLY CHECK→BODY ASSEMBLY
   →BODY ASSEMBLY CHECK→BODY PAINTING→JOINING→PARTS INSTALLATION
   →OPTION INSTALLATION→ENTIRE CHECK→SHIPPING
6) ENGINE ASSEMBLY→ENGINE ASSEMBLY CHECK→BODY ASSEMBLY
   →BODY ASSEMBLY CHECK→BODY PAINTING→JOINING→PARTS INSTALLATION
   →ENTIRE CHECK→REPAIR→ENTIRE CHECK→SHIPPING
```

FIG.25

```
B-1)"OPTION INSTALLATION","REPAIR"
B-2)"PARTS INSTALLATION→OPTION INSTALLATION",
    "OPTION INSTALLATION→ENTIRE CHECK",
    "ENTIRE CHECK→REPAIR","REPAIR→ENTIRE CHECK"
```

FIG.26

```
PROCESSING SECTION:ENTIRE CHECK→SHIPPING
CONSTRAINT CONDITION:PASSING THROUGH JOINING
A-1)NONE
A-2)NONE
B-1)"OPTION INSTALLATION","REPAIR"
B-2)"PARTS INSTALLATION→OPTION INSTALLATION"
    "OPTION INSTALLATION→ENTIRE CHECK"
    "ENTIRE CHECK→REPAIR"
    "REPAIR→ENTIRE CHECK"

IMPROVEMENT EFFECT:0.7h
```

FIG.27

```
[ENTIRE]
1)5.3h, 0.1
2)7.5h, 0.1
3)11.1h, 1.2
4)7.0h, 0.1
5)9.0h, 0.1
6)9.5h, 0.6
```

FIG.28

```
"BODY ASSEMBLY","BODY ASSEMBLY CHECK","BODY PAINTING",
"ENGINE ASSEMBLY","ENGINE ASSEMBLY CHECK","JOINING",
"PARTS INSTALLATION","OPTION INSTALLATION","ENTIRE CHECK","SHIPPING"
```

FIG.29

"BODY ASSEMBLY→BODY ASSEMBLY CHECK",
"BODY ASSEMBLY CHECK→BODY PAINTING",
"BODY PAINTING→ENGINE ASSEMBLY",
"ENGINE ASSEMBLY→ENGINE ASSEMBLY CHECK",
"ENGINE ASSEMBLY CHECK→JOINING",
"JOINING→PARTS INSTALLATION",
"PARTS INSTALLATION→OPTION INSTALLATION",
"OPTION INSTALLATION→ENTIRE CHECK"
"ENTIRE CHECK→SHIPPING"

FIG.30

A-2)"BODY PAINTING→ENGINE ASSEMBLY"
"ENGINE ASSEMBLY CHECK→JOINING"

FIG.31

B-2)"ENGINE ASSEMBLY CHECK→ENGINE ASSEMBLY"
"BODY PAINTING→JOINING"

FIG.32

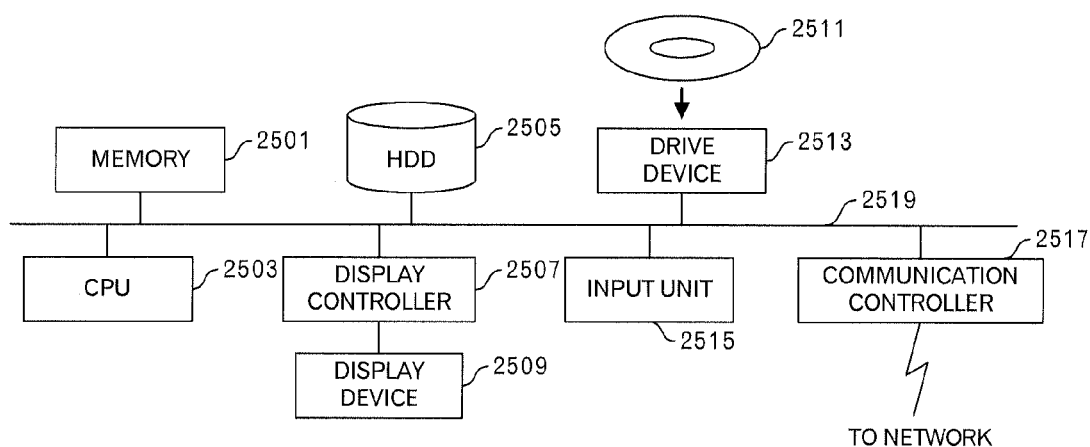

FIG.33

BUSINESS FLOW ANALYSIS METHOD AND APPARATUS

CROSS-REFERENCE TO RELATED APPLICATIONS

This application is a continuing application, filed under 35 U.S.C. section 111(a), of International Application PCT/JP2008/062561, filed Jul. 11, 2008.

FIELD

This technique relates to an analysis technique of a business flow.

BACKGROUND

For instance, a technique to automatically generate a business flow by collecting and analyzing data generated in a business application system used in a company or the like in order to carryout a Business Process Re-engineering (BPR) has already been known. In this technique, because the business flow is extracted from transaction data generated by actually carrying out jobs, the business flow whose frequency is less is identified as an exceptional flow by analyzing the occurrence frequencies of the respective business flows to show this exceptional flow to the user.

In the aforementioned technique, a state of the business flow, which is currently carried out, can be grasped. However, it is impossible to automatically extract an improvement candidate of the business flow.

SUMMARY

A business flow analysis method includes: extracting a series of transaction records for each case from a database storing transaction records for processing results of respective performed jobs, generating, for each of the cases, a process instance including job names and time data of the performed jobs, which are arranged in a time series, and storing data of the process instance into a process instance storage device; classifying process instances satisfying a designated condition among process instances stored in the process instance storage device; calculating, for each classification of the process instances, an average value and a standard deviation of transition periods that are differences between a start time and an end time of a job section to be processed, in the process instances satisfying the designated condition, and storing the calculated average value and the calculated standard deviation into a storage device; identifying a classification of the process instances satisfying a predetermined condition representing that it is possible to reduce a transition period of the job section, based on the average value and said standard deviation, which are stored in the storage device; comparing either of jobs and inter-job transitions, which are included in the process instance belonging to the identified classification of the process instances satisfying the predetermined condition, with either of jobs and inter-job transitions, which are included in the process instances belonging to classifications of process instances that do not satisfy the predetermined condition, to extract either of a feature job and a feature inter-job transition, which are included in the process instance belonging to the identified classification of the process instances satisfying the predetermined condition, and either of a feature job and a feature inter-job transition, which are included in the process instances belonging to the classifications of the process instances that do not satisfy the predetermined condition; and outputting the extracted data as improvement candidates into an output device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is a diagram depicting an example of data stored in a table A;

FIG. 7 is a diagram depicting an example of data stored in a table B;

FIG. 8A is a diagram depicting an example of data stored in a table C;

FIG. 8B is a diagram to explain a process instance;

FIG. 9 is a diagram to explain the transition period;

FIG. 10 is a diagram depicting process instance types to be processed in a first example;

FIG. 18 is a diagram depicting events and inter-event transitions to be shown, which are extracted in the first example;

FIG. 19 is a diagram depicting one example of data to be shown to the user in the first example;

FIG. 20 is a diagram depicting processing instance types to be processed in the second example;

FIG. 22 is a diagram depicting the process instance types extracted as the improvement candidate in the second example;

FIG. 23 is a diagram depicting events common to the process instance types extracted as the improvement candidates in the second example;

FIG. 24 is a diagram depicting inter-event transitions common to the process instance types extracted as the improvement candidates in the second example;

FIG. 25 is a diagram depicting the process instance types other than the improvement candidates in the second example;

FIG. 26 is a diagram depicting the events and inter-event transitions to be shown, which are extracted in the second example;

FIG. 27 is a diagram depicting data to be shown to the user in the second example;

FIG. 28 is a diagram depicting the average value and standard deviation of the transition periods in a third example;

FIG. 29 is a diagram depicting events in the process instances extracted as the improvement candidate in the third example;

FIG. 30 is a diagram depicting inter-event transitions in the process instances extracted as the improvement candidates in the third example;

FIG. 31 is a diagram depicting the inter-event transitions extracted in the third example;

FIG. 32 is a diagram depicting the inter-event transitions extracted in the third example; and FIG. 33 is a functional block diagram of a computer.

DESCRIPTION OF EMBODIMENTS

In this embodiment, a time period between events (i.e. job or processing) in the business flow is called a transition period, and the transition period is considered as being almost equal to a job processing time. Various factors (e.g. the business flow or other factors) determine this transition period, depending on the business or system to be considered. However, in this embodiment, the jobs or systems (including a case of a portion of them) whose transition period is determined based on the business flow are considered, and it is automatically judged whether or not the reduction of the transition period, that is, the efficiency improvement of the business processing can be made by changing the business flow. The judgement of whether or not the job or system is to be considered is based on whether or not the transition period has the correlation with the business flow. Specifically, the presence of the correlation is judged based on whether or not the standard deviation of the transition periods for a section of the same inter-event transition is less than a threshold, and when the standard deviation of the transition periods is less than the threshold, it is judged that the correlation exists.

Incidentally, this embodiment assumes following matters. Namely, the same kind of the process instance is executed two or more times. Generally, because it is unknown whether or not the correlation between the business flow and the transition period exists, a process to judge whether or not the correlation exists is carried out. However, it is impossible to calculate the standard deviation for the process instance that was executed only once. In case where the same kind of process instance is executed two or more times, when the transition periods of the section of the same inter-event transition have a close value for the respective process instances (namely, the standard deviation is less than the threshold), it can be judged that the correlation between the transition period of the section and the business flow exists.

Figure 1:
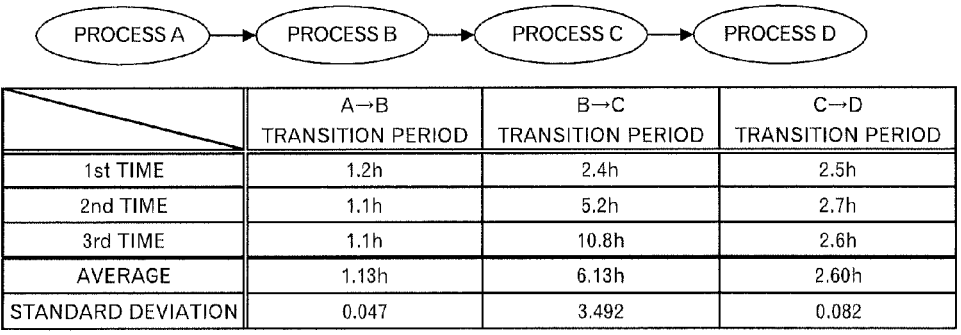
FIG. 1 is a diagram to explain an average value and standard deviation of transition periods.

For example, when a process instance that the jobs are executed in order of process A, process B, process C and process D was executed tree times, the average value and the standard deviation are calculated for each of the transition period from A to B, the transition period from B to C and the transition period from C to D. The calculated results are depicted in FIG. 1. According to the calculation results depicted in FIG. 1, the standard deviations of the transition period from A to B and the transition period from C to D are less than the threshold "0.5", and it is judged that the transition from A to B and the transition from C to D have the correlation. On the other hand, because the standard deviation of the transition period from B to C largely exceeds the threshold "0.5", it is judged that the transition from B to C has no correlation.

Figure 2:
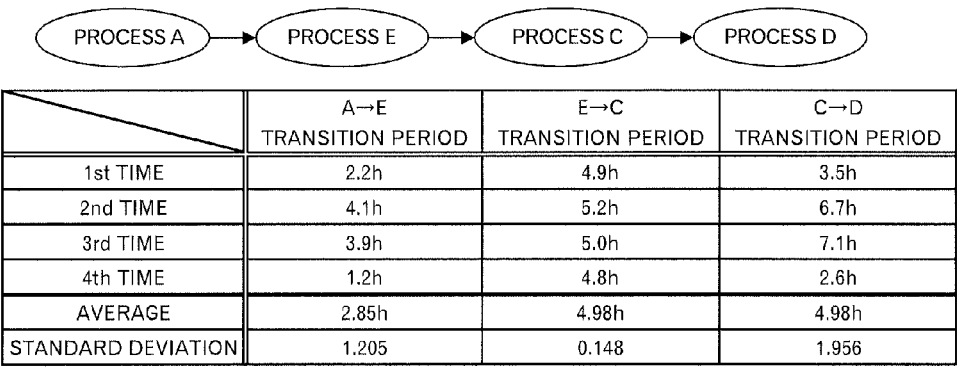
FIG. 2 is a diagram to explain the average value and standard deviation of the transition periods.

Second, it is assumed that somewhat similar but different process instances exist. In order to identify what portion in the process instances influences the transition period, it is assumed that plural process instances having a little different portion exist. For example, it is assumed that a second process instance that the jobs are executed in order of process A, process E, process C and process D, as depicted in FIG. 2, exists, in addition to the first process instance that the jobs are executed in order of process A, process B, process C and process D, as depicted in FIG. 1. Because the second process instances were executed four times, the average values and the standard deviations can be calculated for each of the transition period from A to E, the transition period from E to C and the transition period from C to D. According to the calculation results depicted in FIG. 2, the transition period from A to E and the transition period from C to D are equal to or greater than the threshold "0.5", and it is judged that the transition from A to E and the transition from C to D have no correlation. On the other hand, because the transition period from E to C is less than the threshold "0.5", it is judged that the transition from E to C has the correlation.

Figure 3:
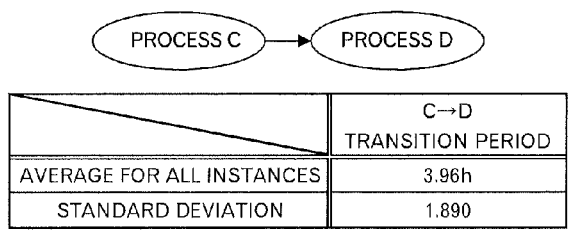
FIG. 3 is a diagram to explain the average value and standard deviation of the transition periods.

The transition from C to D is common to the first and second process instances, and when the average value and the standard deviation of the transition periods for a section from C to D are calculated for all process instances of the first and second process instances, the results are obtained as depicted in FIG. 3. It is judged for the transition from C to D in the first process instance has the correlation, but it is judged for the transition from C to D in the second process instance has no correlation. In addition, because the result of all of 7 times depicted in FIG. 3 exceeds the threshold "0.5", it is judged that the result of all of 7 times has no correlation.

According to the total circumstances, it is judged that the transition from C to D is executed in the processing order of the first process instance with a predictable and fixed transition period, but the transition from C to D is executed in the other processing order with an unpredictable transition period, and the transition period is determined based on factors other than the business flow.

Figure 4:
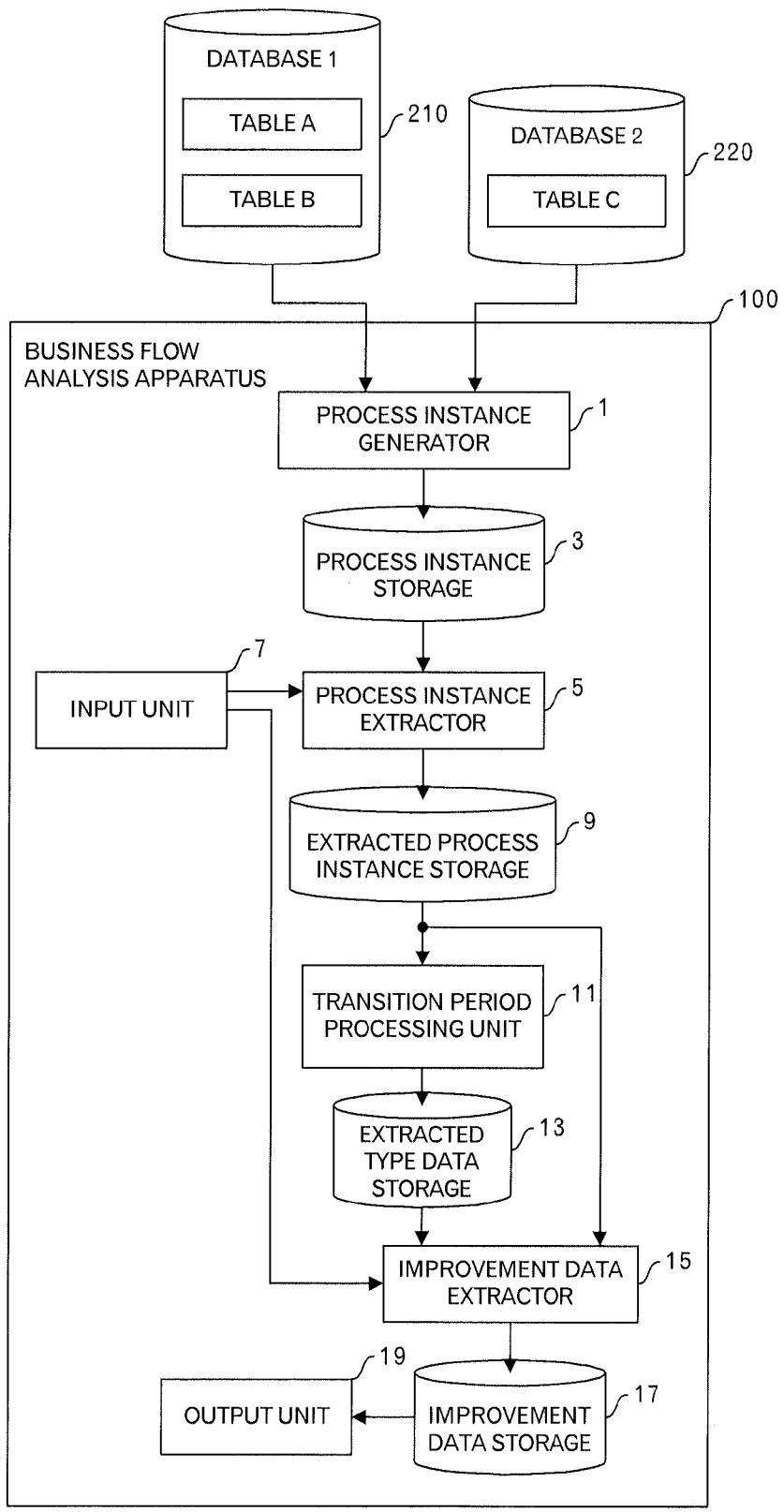
FIG. 4 is a functional diagram of a business flow analysis apparatus relating to an embodiment.

Under the aforementioned assumptions, this embodiment introduces a business flow analysis apparatus 100 as depicted in FIG. 4. As depicted in FIG. 4, the business flow analysis apparatus 100 has a process instance generator 1 that generates data of process instances from data stored in one or plural databases (e.g. databases 210 and 220) and carries out a processing to group the same type of process instance; a process instance storage 3 storing process instances generated by the process instance generator 1; an input unit 7 that accepts inputs of a processing section to be considered, constraint conditions and the like; a process instance extractor 5 that carries out a processing to extract data of the process instance to be processed from the process instance storage 3 according to the input data from the input unit 7; an extracted process instance storage 9 storing data of the process instances extracted by the process instance extractor 5; a transition period processing unit 11 that carries out a processing for the transition period as will be explained in the following by using data stored in the extracted process instance storage 9; an extracted type data storage 13 storing a processing result of the transition period processing unit 11; an improvement data extractor 15 that carries out a processing to extract improvement data of the business flow according to data from the input unit 7 by using data stored in the extracted process instance storage 9 and the extracted type data storage 13; the improvement data storage 17 storing a processing result of the improvement data extractor 15; and an output unit 19 that outputs data stored in the improvement data storage 17.

Figure 5:
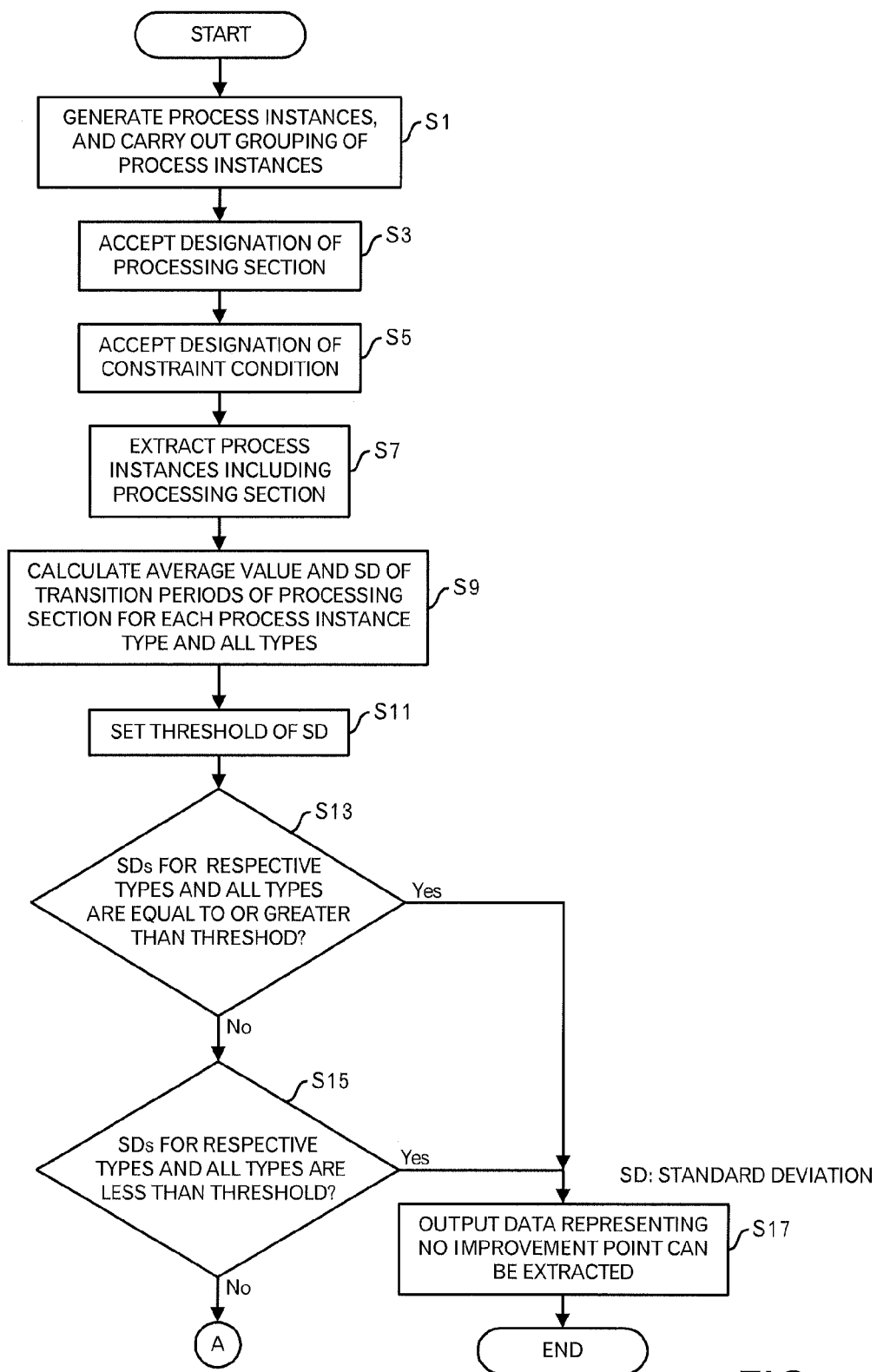
FIG. 5 is a diagram depicting a processing flow in the embodiment.

Next, processing contents of the business flow analysis apparatus 100 depicted in FIG. 4 will be explained by using FIGS. 5 to 32. First, the process instance generator 1 carries out a process to generate process instances by using data stored in the databases, and to group the generated process instances and stores processing results into the process instance storage 3 (FIG. 5: step S1).

For example, data as depicted in FIG. 6 is stored in a table A of the database 210, data as depicted in FIG. 7 is stored in a table B of the database 210, and data as depicted in FIG. 8A is stored in a table C of the database 220. In the tables depicted in FIGS. 6 to 8A, an identifier to identify a case, a processing type (i.e. event name) and a processing time are registered. Here, the process instance generator 1 extracts records whose identifiers are the same. For example, when records whose identifier is "ID001" and to which a star mark is attached are extracted, data as depicted in FIG. 8B is obtained. Namely, it is understood from the processing time, that a processing is carried out in order of process A, process B, process C and process D. Thus, the process instance including the processes A, B, C and D is identified as one type, and the process instances including the same processes are collected, and they are stored into the process instance storage 3.

Next, the input unit 7 prompts the user to designate the processing section to be considered, accepts the designation of the processing section from the user, and outputs data of the designation to the process instance extractor 5 (step S3). The plural processing sections may be designated, and the entire specific process instance type may be designated. In addition, the input unit 7 prompts the user to designate constraint conditions, accepts the designation of the constraint conditions from the user, and outputs data of the designation to the improvement data extractor 15 (step S5). However, the constraint conditions may not be designated.

After that, the process instance extractor 5 extracts data of the process instances including the designated processing section from the process instance storage 3, and stores the extracted data into the extracted process instance storage 9 (step S7). As depicted in FIGS. 1 and 2, all of the process instances having the section from the process C to the process D are extracted. When plural processing sections are designated, the process instances including either of the transitions corresponding to the designated processing sections are extracted.

Then, the transition period processing unit 11 calculates the average value and the standard deviation of the transition periods for each type of the extracted process instances and the entire extracted processing instances, by using data of the process instances stored in the extracted process instance storage 9, and temporarily stores the calculation results into the extracted type data storage 13 (step S9). First, as depicted in FIG. 9, the transition period processing unit 11 calculates the transition periods based on the difference between the time of the start process and the time of the end process in the designated processing section. When the processing section is a section from the process B to the process C, the difference between the time (1/11 11:07:56) of the process B and the time (1/11 12:09:47) of the process C is calculated to obtain the transition period "1:00". Then, for each type of the process instances, the average value and the standard deviation of the transition periods for the processing section are calculated. As depicted in FIGS. 1 and 2, when the processing section is a section from the process C to the process D, the average value and the standard deviation of the transition periods for the section from the process C to the process D are calculated. Furthermore, for all types of the process instances, the average value and the standard deviation of the transition periods for the processing section is also calculated. For example, when there are only the first and second process instance types, as depicted in FIGS. 1 and 2, the average value and the standard deviation of the transition periods for the section from the process C to the process D are calculated for the entire of the first and second process instance types as depicted in FIG. 3.

Furthermore, the transition period processing unit 11 sets a threshold of the standard deviation (step S11). The threshold of the standard deviation may be a fixed value, or may be calculated by a ratio for the average value or the like. Furthermore, the user may set it.

Then, the transition period processing unit 11 judges whether or not the standard deviation for all of the process instance types and the standard deviations for the respective types are equal to or greater than the threshold (step S13).

Here, it is assumed that process instances as depicted in FIG. 10 are extracted. Namely, following process instance types exist: (1) First process instance type including standard specification car, body assembly, body assembly check, body painting, engine joining, and option. (2) Second process instance type including special specification car, body assembly, body assembly check, body painting, engine joining, and option. (3) Third process instance type including special specification car, body assembly, body assembly check, body painting, engine joining, and no option. (4) Fourth process instance type including standard specification car, body assembly, body assembly check, body painting, engine joining, and no option.

Figure 11:
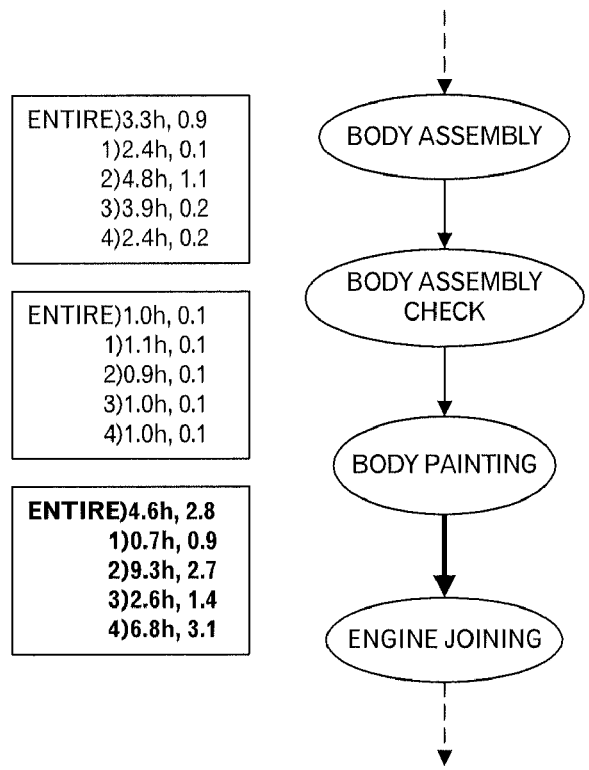
FIG. 11 is a diagram to explain a processing for the first example.

Then, as depicted in FIG. 11, when the average value and the standard deviation for the section from the body assembly to the body assembly check are calculated for 4 types of process instances, "3.3h" and "0.9" are obtained for the entire of the process instance types, "2.4h" and "0.1" are obtained for the first process instance type, "4.8h" and "1.1" are obtained for the second process instance type, "3.9h" and "0.2" are obtained for the third process instance type, and "2.4h" and "0.2" are obtained for the fourth process instance type. In addition, when the average and the standard deviation for the section from the body assembly check to the body painting are calculated for 4 types of process instances, "1.0h" and "0.1" are obtained for the entire of the process instance types, "1.1h" and "0.1" are obtained for the first process instance type, "0.9h" and "0.1" are obtained for the second process instance type, "1.0h" and "0.1" are obtained for the third process instance type, "1.0h" and "0.1" are obtained for the fourth process instance type. Furthermore, when the average value and the standard deviation for the section from the body painting to the engine joining are calculated for 4 types of process instances, "4.6h" and "2.8" are obtained for the entire of the process instance types, "0.7h" and "0.9" are obtained for the first process instance type, "9.3h" and "2.7" are obtained for the second process instance type, "2.6h" and "1.4" are obtained for the third process instance type, and "6.8h" and "3.1" are obtained for the fourth process instance type.

In such a case, when the process section is a section from the body painting to the engine joining and the threshold is "0.5", it is judged that the condition at the step S13 is satisfied. Thus, when the condition that the standard deviation for the entire of the types and the standard deviations for the respective types are equal to or greater than the threshold is satisfied, it is indicated that it is impossible to predict the transition period of the processing section and the transition period is determined based on a factor other than the business flow, even if any business flow (also called "route") is selected. Therefore, there is almost no room to reduce the transition period even if any business flow is selected.

Therefore, when the condition at the step S13 is satisfied, the transition period processing unit 11 stores data representing "impossible to improve" into the extracted type data storage 13. When the data representing "impossible to improve" is stored in the extracted type data storage 13, the improvement data extractor 15 stores the data representing "impossible to improve" into the improvement data storage 17 as it is. The output unit 19 outputs data representing that no improvement point can be extracted to an output device such as a display device or printer based on data representing "impossible to improve", which is stored in the improvement data storage 17 (step S17).

Figure 12:
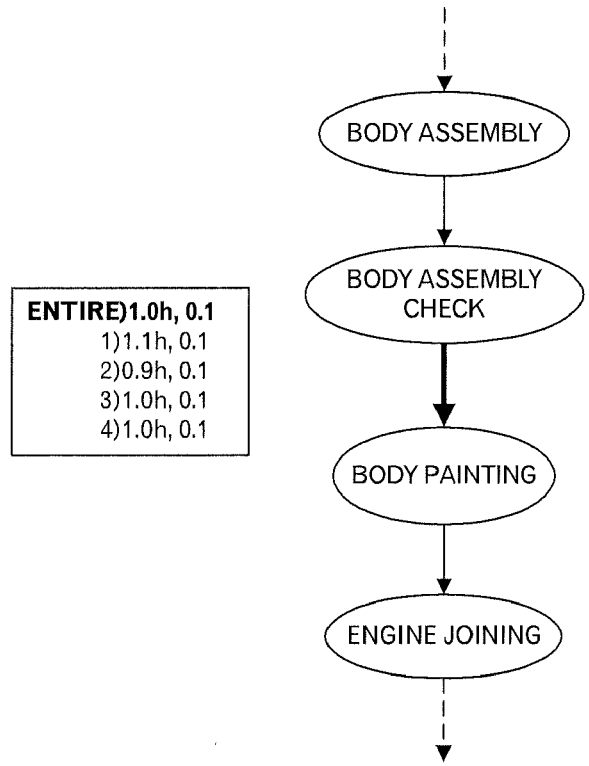
FIG. 12 is a diagram to explain the processing for the first example.

On the other hand, when the condition at the step S13 is not satisfied, the transition period processing unit 11 judges whether or not the standard deviation for the entire of the types and the standard deviations for the respective types are less than the threshold (step S15). In the example of FIGS. 10 and 11, when the processing section is a section from the body assembly check to the body painting as depicted in FIG. 12, all of the standard deviations for the first to fourth process instance types are "0.1" and less than the threshold "0.5", and the standard deviation for all types is also less than the threshold. In such a case, it is understood that the transition periods for the section from the body assembly check to the body painting are almost fixed values (almost "1.0h" as depicted in FIG. 12) regardless of the business flows. Therefore, there is almost no room to reduce the transition period by selecting the business flow.

Therefore, when the condition at the step S15 is satisfied, the processing shifts to the step S17, and as described above, data representing that the improvement point cannot be extracted is outputted. On the other hand, when the condition at the step S15 is not satisfied, the processing shifts to a processing of FIG. 13 through a terminal A.

Figure 13:
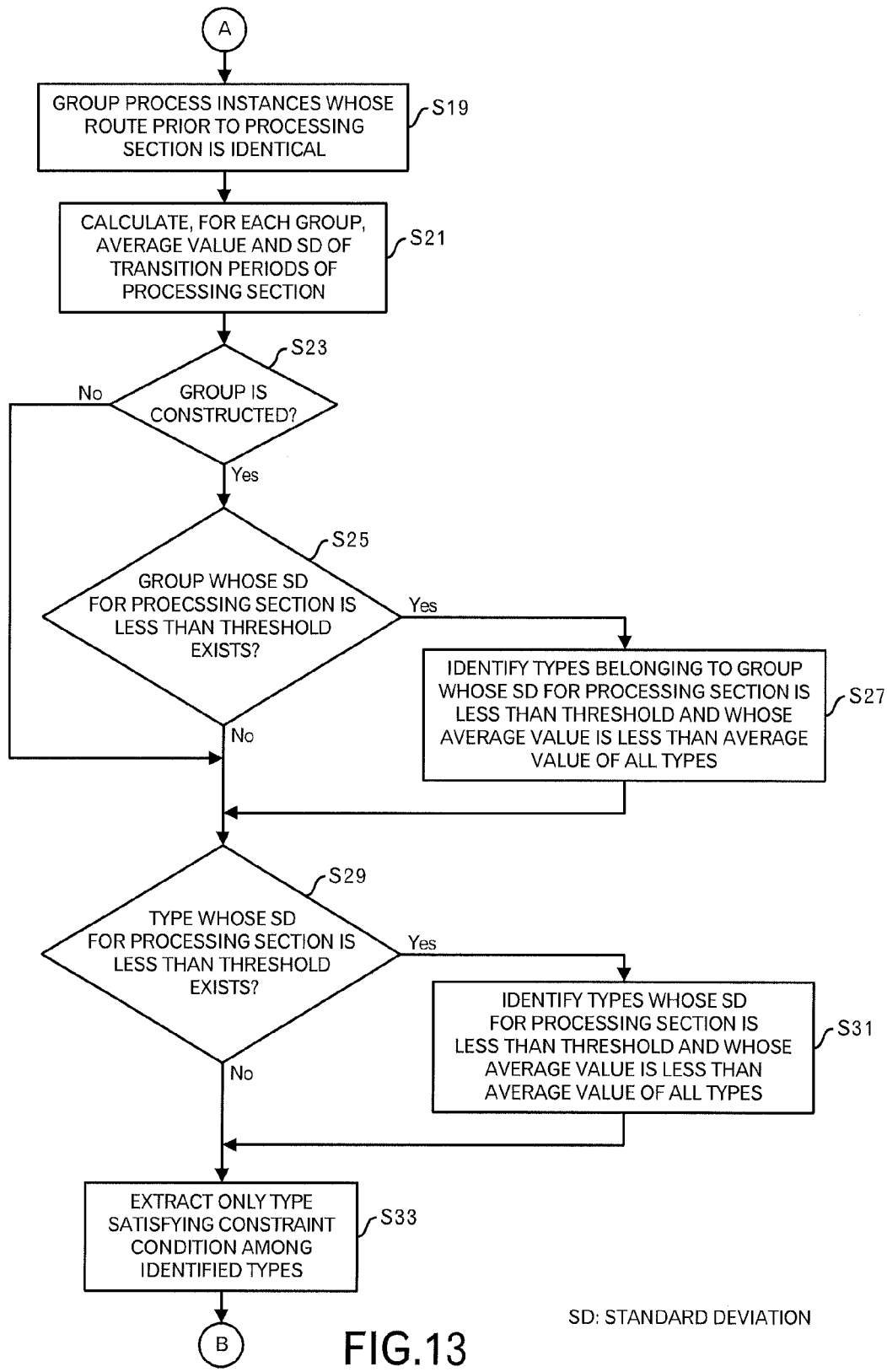
FIG. 13 is a diagram to explain a processing in the embodiment.

Shifting to the explanation of the processing of FIG. 13, the transition period processing unit 11 groups plural types whose routes prior to the processing section are the same among the process instances stored in the extracted process instance storage 9 (step S19). For example, when the process instances as depicted in FIG. 10 exist and the processing section is a section from the body assembly to the body assembly check, a route, which passes through the event "standard specification car" to the body assembly, (first and fourth process instance types) and a route, which passes through an event "special specification car" to the body assembly, (second and third process instances) exist. Thus, the process instance types are grouped according to the routes prior to the processing section.

Figure 14:
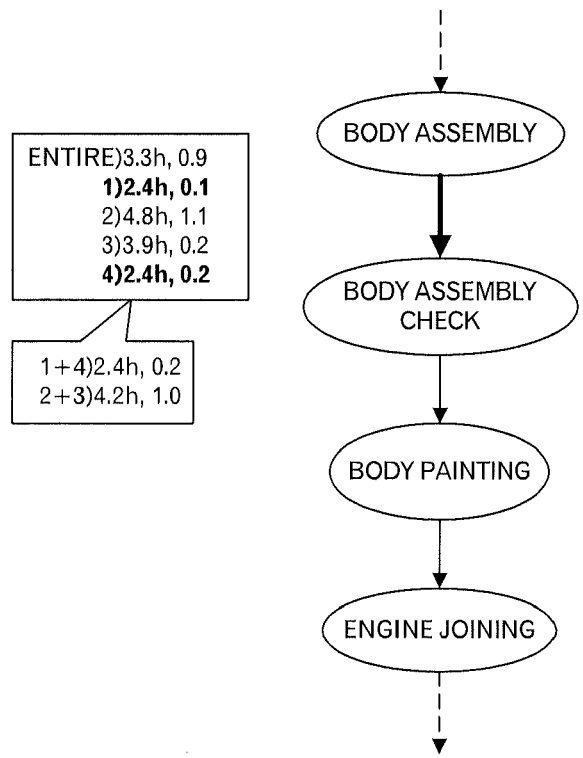
FIG. 14 is a diagram to explain the processing for the first example.

After that, when the grouping can be made, the transition period processing unit 11 calculates the average value and the standard deviation of the transition periods for the processing section, for each group, and stores the calculation results into the extracted type data storage 13, for example (step S21). For example, as depicted in FIG. 14, when the process section is a section from the body assembly to the body assembly check, the standard deviation for all of the process instance types exceeds the threshold "0.5" and the standard deviation for the second process instance type exceeds the threshold "0.5". Therefore, the section from the body assembly to the body assembly check will be processed at the step S19 and subsequent steps. Then, as described above, as for the first and fourth process instance types, the prior event (i.e. route) is "standard specification car" and as for the second and third process instance types, the prior event (i.e. route) is "special specification car". Therefore, when the average value and the standard deviation of the transition periods are calculated for the first and fourth process instance types, "2.4h" and "0.2" are obtained. On the other hand, when the average value and the standard deviation of the transition periods are calculated for the second and third process instance types, "4.2h" and "1.0" are obtained. Therefore, when the prior route is "standard specification car", like the first and fourth process instance types whose standard deviation is less than the threshold and which has the correlation, the transition periods for the section from the body assembly to the body assembly check are almost unique "2.4h". Furthermore, in such a case, because the average value "2.4h", which is shorter than the average "3.3h" for all of the types, is calculated, it can be understood that the prior route "standard specification car" in the first and fourth process instance types is a route having the improvement effect.

In order to carry out such judgment, the transition period processing unit 11 judges whether or not any group is constructed at the step S19 (step S23). When no group is constructed, namely, groups, which are the same as the original process instance types, are constructed, the processing shifts to step S29.

On the other hand, when any group is constructed at the step S19, the transition period processing unit 11 judges based on data calculated at the step S21, whether or not any group whose standard deviation for the processing section is less than the threshold exists (step S25). In the aforementioned example, the group of the first and second process instance types is identified. When any group whose standard deviation for the processing section is less than the threshold exists, the transition period processing unit 11 identifies process instance types belonging to a group whose standard deviation for the processing section is less than the threshold and whose average value is less than the average value for all types or whose value calculated by adding the standard deviation to the average value is less than the average value for all types, and stores data of the identified process instance type into the extracted type data storage 13 (step S27). In the aforementioned example, the average value of the transition periods for the processing section in the first and fourth process instance types is "2.4h" and the standard deviation is "0.2". Therefore, "2.4h" or "2.6h (=2.4h+0.2)" is less than the average value "3.3h" for all types. Therefore, data of the first and fourth process instance type is stored into the extracted type data storage 13. Incidentally, when this condition is not satisfied, no data is extracted, because the possibility to reduce the transition period is low. The processing shifts to the step S29. However, the process instance types extracted at the step S27 is not processed.

Figure 15:
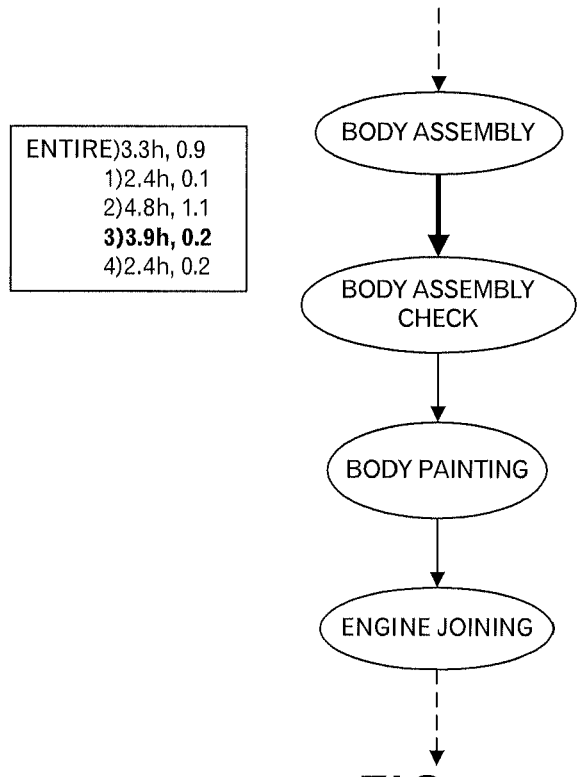
FIG. 15 is a diagram to explain the processing for the first example.

Furthermore, the transition period processing unit 11 judges whether or not any type whose standard deviation for the processing section is less than the threshold exists (step S29). In the processing flow up to this step, when all of the standard deviations for the processing section are less than the threshold, the processing shifts to the step S17, and when the condition at the step S27 is satisfied after grouping for each prior route, the process instance types are extracted at the step S27. Therefore, the process instance types, which were not extracted at the step S25 or S27 are processed at this step. As depicted in FIG. 15, when the processing section is a section from the body assembly to the body assembly check, the second and third process instance types are processed at the step S29, and the third process instance type whose standard deviation is less than the threshold "0.5" is identified among them. This third process instance type has the correlation with the entire of the business flow. Basically, because the transition period for the processing section is settled after the entire of the business flow is fixed, there is almost no room to reduce the transition period even when this business flow is selected.

When any process instance type satisfying the condition at the step S29 exists, the transition period processing unit 11 identifies a process instance type whose standard deviation for the processing section is less than the threshold and whose average value is less than the average value for all types or whose value calculated by adding the standard deviation to the average value is less than the average value for all types, and stores data of the identified process instance type into the extracted type data storage 13 (step S31). In the example of FIG. 15, the standard deviation for the processing section in the third process instance type is less than the threshold. However, because the average value is "3.9h", this average value exceeds the average value "3.3h" for all types Therefore, the condition at the step S31 is not satisfied. Therefore, no process instance type is extracted in the example of FIG. 15. The processing shifts to the step S33.

Figures 16, 17:
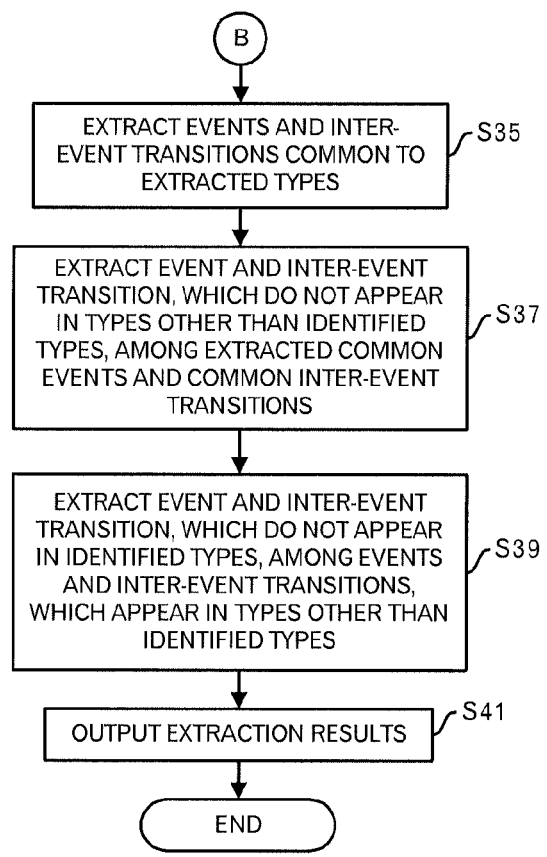
FIG. 16 is a diagram depicting process instance types extracted as improvement candidates in the first example.
FIG. 17 is a diagram depicting the processing in the embodiment.

When the processing is carried out up to this step, data as depicted in FIG. 16 is stored in the extracted type data storage 13, in the aforementioned example. In the example of FIG. 16, for each process instance type, corresponding event (processing) names or IDs are included.

The improvement data extractor 15 extracts only a type satisfying the constraint condition among the process instance types stored in the extracted type data storage 13 (step S33). The constraint condition is a condition that a specific event (process) is passed or not passed, for example, and only the process instance type satisfying this condition will be processed in the following. The processing shifts to a processing of FIG. 17 through a terminal B.

Shifting to the explanation of a processing in FIG. 17, the improvement data extractor 15 extracts events and inter-event transitions common to the process instance types stored in the extracted type data storage 13, and stores the extracted data into the improvement data storage 17, for example (step S35). In the aforementioned example, the first and fourth process instance types are extracted, the common events are "standard specification car", "body assembly", "body assembly check", "body painting", and "engine joining", and the common inter-event transitions are transition "from the standard specification car to the body assembly", "from the body assembly to the body assembly check", "from body assembly check to the body painting" and "from the body painting to the engine joining".

Furthermore, the improvement data extractor 15 extracts events and inter-event transitions, which do not appear in the types other than the process instance types stored in the extracted type data storage 13, among the extracted common events and the common inter-event transitions, and stores the extracted data into the improvement data storage 17 (step S37). The types other than the process instance types stored in the extracted type data storage 13 are identified from the extracted process instance storage 9. In the aforementioned example, events "special specification car", "body assembly", "body assembly check", "body painting", "engine joining", "option" and "no option" are included in the second and third process instance types, and the inter-event transitions "from the special specification car to the body assembly" "from the body assembly to the body assembly check", "from the body assembly check to the body painting", "from the body painting to the engine joining", "from the engine joining to the option" and "from the engine joining to the no option" are included in the second and third process instance types.

Therefore, the event satisfying the condition at the step S37 is "the standard specification car", and the inter-event transition satisfying the condition at the step S37 is the transition "from the standard specification car to the body assembly".

Furthermore, the improvement data extractor 15 extracts events and inter-event transitions, which do not appear in the process instance types stored in the extracted type data storage 13, among the events and the inter-event transitions, which appear in the types other than the process instance types stored in the extracted type data storage 13, and stores the extracted data into the improvement data storage 17 (step S39). In the aforementioned example, the event satisfying the condition at the step S39 is "the special specification car", and the inter-event transition satisfying the condition at the step S39 is the transition "from the special specification car to the body assembly".

Thus, when data extracted by the improvement data extractor 15 at the steps S37 and S39 is summarized, data as depicted in FIG. 18 is obtained. A-1) indicates the event extracted at the step S37, A-2) indicates the inter-event transition extracted at the step S37, B-1) indicates the event extracted at the step S39, and B-2) indicates the inter-event transition extracted at the step S39. A-1) and A-2) mean that it is possible to reduce the transition period by adopting the event or inter-event transition. On the other hand, B-1) and B-2) mean it is possible to reduce the transition period when the event or inter-event transition is not adopted.

Incidentally, because there are only 4 process instance types as depicted in FIG. 10 in the aforementioned example, the first and fourth process instance types must be adopted in order to realize A-1), A-2), B-1) and B-2). When the processing section is "the section from the body assembly to the body assembly check", it is possible to calculate the difference between the average value of the transition periods, which is calculated for the group including the first and fourth process instance types, and the average value for all types as depicted in FIG. 14. Namely, 0.9h="3.3h"–"2.4h" is obtained. Thus, the improvement effect in case where the respective conditions in FIG. 18 are adopted may be calculated by the difference between the average value for that case and the average value for all types.

Finally, the output unit 19 outputs data stored in the improvement data storage 17 to the output device to show the data to the user (step S41). For example, data as depicted in FIG. 19 is shown. Incidentally, the meanings of A-1), A-2), B-1) and B-2) may be specifically shown. In addition, the improvement effect may be shown for each case.

By carrying out the aforementioned processing, the effective improvement points to reduce the transition period for the processing section can be automatically extracted based on the correlation with the prior route and/or the correlation with the entire flow. Furthermore, it becomes possible to show, as the improvement effect, the difference between the average value of the transition periods in case where the improvement points are adopted and the average value for all types.

Next, in order to make it easy to understand the aforementioned processing flow, the second and third examples will be explained by using FIGS. 20 to 32. At this time, as depicted in FIG. 20, it is assumed that 6 process instance types are extracted. Incidentally, the processing section is a section from the entire check to the shipping, and all of 6 process instance types are processed. Incidentally, the constraint condition is a condition that it passes through the "joining" event. All process instance types also satisfy this constraint condition.

Figure 21:
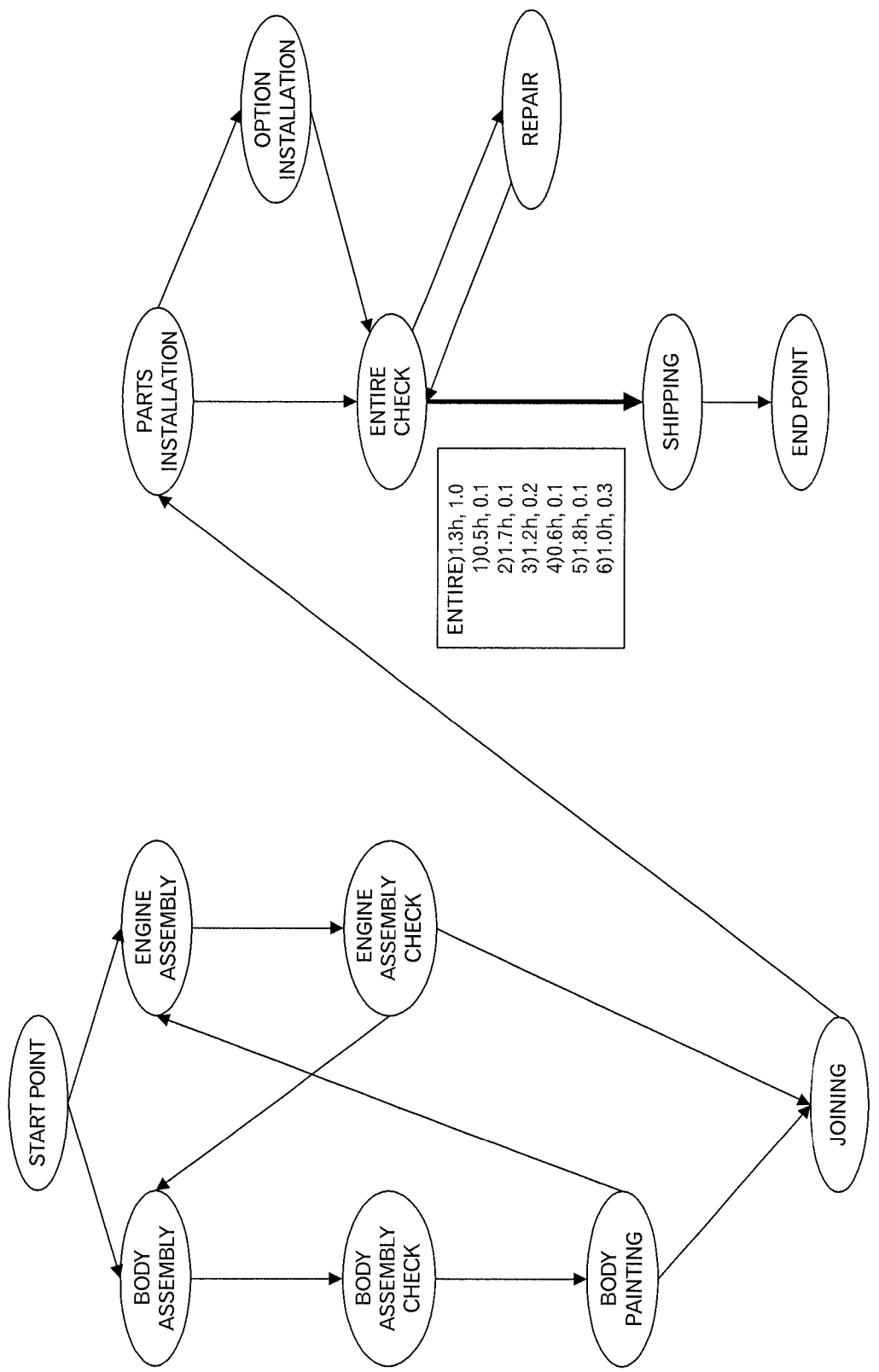
FIG. 21 is a diagram depicting schematically superimposed process instance types to be processed in the second example.

When the process instances depicted in FIG. 20 are superimposed to schematically depict them, a figure as depicted in FIG. 21 is obtained. As depicted in FIG. 21, the average value and the standard deviation of the section from the entire check to the shipping for all types are "1.3h" and "1.0", the average value and the standard deviation for the first process instance type are "0.5h" and "0.1", the average value and the standard deviation for the second process instance type are "1.7h" and "0.1", the average value and the standard deviation for the third process instance type are "1.2h" and "0.2", the average value and the standard deviation for the fourth process instance type are "0.6h" and "0.1", the average value and the standard deviation for the fifth process instance type are "1.8h" and "0.1", and the average value and the standard deviation for the sixth process instance type are "1.0h" and "0.3". From this, it is judged that the condition at the step S13 is not satisfied and the condition at the step S15 is not also satisfied. In addition, because the routes prior to the processing section are different among the 6 process instance types, the grouping cannot be made. Namely, at the step S23, the processing shifts to the step S29. At the step S29, the process instance type whose standard deviation for the processing section is less than the threshold "0.5" is extracted. However, all process instance types are extracted in this example. However, because the process instance type having the improvement effect is only a process instance type whose value calculated by adding the standard deviation to the average value is less than the average value for all types, only first and fourth process instance types are identified at the step S31. Namely, the process instance types extracted by the transition period processing unit 11 are the process instance types as depicted in FIG. 22.

Furthermore, as depicted in FIG. 23, when the step S35 is carried out, the events common to the first and fourth process instance types are "body assembly", "body assembly check", "body painting", "engine assembly", "engine assembly check", "joining", "parts installation", "entire check" and "shipping". Moreover, as depicted in FIG. 24, the inter-event transition common to the first and fourth process instance types are transitions "from the body assembly to the body assembly check", "from the body assembly check to the body painting", "from the engine assembly to the engine assembly check", "from the joining to the parts installation", "from parts installation to the entire check" and "from the entire check to the shipping".

Furthermore, at the step S37, the events and inter-event transitions, which do not appear in the process instance types (FIG. 25) other than the processing instance types depicted in FIG. 22, are extracted among the events and inter-event transitions depicted in FIGS. 23 and 24. Here, no pertinent events and inter-event transitions exist.

On the other hand, as for the events and inter-event transitions that do not appear in the process instance types depicted in FIG. 22 among the process instance types depicted in FIG. 25, the events "the option installation" and "repair" and the transitions "from the parts installation to the option installation", "from the option installation to the entire check", "from the entire check to the repair" and "from the repair to the entire check" are identified at the step S39, as depicted in FIG. 26. Namely, by adopting the process instance types that do not include "the option installation" and "the repair", the reduction of the transition period is expected. Incidentally, the extracted inter-event transitions are covered by the condition that "the option installation" and "the repair" are not included. As for the improvement effect, the average value of the transition periods for the processing section in the first and fourth process instance types is calculated, and the difference between the calculated average value and the average value for all types is calculated. Then, the output unit 19 outputs data as depicted in FIG. 27, for example.

Furthermore, the processing will be explained by using the third example. Also here, it is assumed that the process instance types depicted in FIG. 20 are extracted. However, the processing section is the entire process, and the constraint condition is a condition that it passes through "the option installation". When the processing section is the entire process, the process instance types are narrowed at the step S7 by the constraint condition. The second and fifth process instance types that it passes through "the option installation" are identified among the process instance types in FIG. 20.

Incidentally, the average value and the standard deviation of the transition periods for each process instance type are values as depicted in FIG. 28. However, the average value and the standard deviation of the transition periods for all types are not calculated, because the flow contents are largely different. Therefore, at the steps S13 and S15, "No routes" are adopted. Furthermore, because no group is constructed, the processing shifts from the step S23 to the step S29, and it is judged whether or not the process instance type whose standard deviation is less than the threshold exists. Here, the second and fifth process instance types are identified. However, because the average value and the standard deviation for all types are not calculated, the process instance type whose average value is the largest is used as the reference at the step S31, and the process instance type whose standard deviation of the processing section is less than the threshold and whose average value is less than the largest average value (or whose value calculated by adding the standard deviation to the average value is less than the largest average value) is extracted. In this example, because the average value of the transition periods for the second process instance type is "7.5h", and the average value of the transition periods for the fifth process instance type is "9.0h", the second process instance type is extracted. Namely, the second process instance type is identified as the improvement candidate.

Moreover, because only one process instance type is extracted at the step S35, all events and all inter-event transitions of the second process instance type are extracted. The events as depicted in FIG. 29 are extracted. Furthermore, the inter-event transitions as depicted in FIG. 30 are extracted.

No event, which does not appear in the fifth process instance type, exists among the events depicted in FIG. 29. Furthermore, the inter-event transitions, which do not appear in the fifth process instance type among the inter-event transitions depicted in FIG. 30, are the transitions "from the body painting to the engine assembly" and "from the engine assembly check to the joining" as depicted in FIG. 31.

On the other hand, no event, which does not appear in the second process instance type, exists among the events, which appear in the fifth process instance type. However, as for the inter-event transition, transitions "from the engine assembly check to the body assembly" and "from the body painting to the joining" are identified as depicted in FIG. 32.

Thus, the extraction results as depicted in FIGS. 31 and 32 are shown to the user. According to this extraction results, the improvement points are a point that the transitions "from the body painting to the engine assembly" and "from the engine assembly check to the joining" are included and a point that the transitions "from the engine assembly check to the body assembly" and "from the body painting to the joining" are not included. In short, the aforementioned points are summarized as follows: the work for the engine should be carried out after the work for the body, but the work for the body should not be carried out after the work for the engine.

Incidentally, as for the aforementioned example that the processing section is the entire flow, a processing including a lot of exceptions is carried out. However, the judgement may be made based on the average value and the standard deviation of the transition periods for the entire flow along with the aforementioned processing flow.

Although the explanation of this embodiment was made, this technique is not limited to this embodiment. For example, the functional block diagram depicted in FIG. 4 is a mere example, and does not always correspond to an actual program module configuration. Furthermore, as for the processing flow, the order of the steps may be exchanged and the steps may be executed in parallel as long as the same processing results can be obtained. In addition, as for the classification and grouping of the process instances, they may be carried out all together at the step that the processing section is designated, or they may be carried out separately, as mentioned above.

The aforementioned embodiment is outlined as follows:

Namely, a business flow analysis method includes: extracting a series of transaction records for each case from a database storing transaction records for processing results of respective performed jobs, generating, for each of the cases, a process instance including job names and time data of the performed jobs, which are arranged in a time series, and storing data of the process instance into a process instance storage device; classifying process instances satisfying a designated condition among process instances stored in the process instance storage device (e.g. the classifying may include a processing to classify the process instances according to the process instance types and to group the process instance types); calculating, for each classification of the process instances, an average value and a standard deviation of transition periods that are differences between a start time and an end time of a job section to be processed, in the process instances satisfying the designated condition, and storing the calculated average value and the calculated standard deviation into a storage device (the average value and the standard deviation of the transition periods for all process instances satisfying the designated condition may be calculated); identifying a classification of the process instances satisfying a predetermined condition representing that it is possible to reduce a transition period of the job section, based on the average value and said standard deviation, which are stored in the storage device; comparing either of jobs and inter-job transitions, which are included in the process instance belonging to the identified classification of the process instances satisfying the predetermined condition, with either of jobs and inter-job transitions, which are included in the process instances belonging to classifications of process instances that do not satisfy the predetermined condition, to extract either of a feature job and a feature inter-job transition, which are included in the process instance belonging to the identified classification of the process instances satisfying the predetermined condition, and either of a feature job and a feature inter-job transition, which are included in the process instances belonging to the classifications of the process instances that do not satisfy the predetermined condition; and outputting the extracted data as improvement candidates into an output device.

When such a processing is carried out, data for the improvement candidate can be automatically shown to the user. Therefore, it is possible to quantitatively obtain the improvement candidate to be adopted, in objective view, not depending on the conventional experience of the user. Especially, when the contents of the business flow are complicated, this processing is particularly effective. Incidentally, the feature job (i.e. event) and feature inter-job transition (i.e. inter-event transition) are event and inter-event transition, which appear only in the process instance type itself. Furthermore, as the improvement effect, the difference between the average value of the transition periods for the job section to be considered in case where the process instances satisfying the predetermined condition are adopted and the average value of the transition periods for the job section to be considered for all of the process instances may be shown.

Incidentally, the predetermined condition may be a condition to extract a classification whose standard deviation of the transition periods is less than a first threshold and whose average value of the transition periods is relatively short, when a standard deviation of the transition periods for all of the process instances satisfying the designated condition is greater than a second threshold. By adopting such a condition, the classification for which the improvement is expected is extracted.

Furthermore, the predetermined condition may be a condition to extract a classification whose standard deviation of the transition periods is less than a first threshold and whose average value of the transition periods or value calculated by adding the standard deviation to the average value of the transition periods is less than an average value of transition periods for all of the process instances satisfying the designated condition, when a standard deviation of the transition periods for all of the process instances satisfying the designated condition is greater than a second threshold. The classification for which the sufficient effect is statistically expected is extracted.

In addition, the classifying may include: first classifying the process instances satisfying the designated condition among the process instances stored in the process instance data storage device into each of process instances whose job names are completely identical; and second classifying the process instances classified at the first classifying into each of process instances whose route prior to the job section to be processed is identical. In such a case, a classification of the process instances whose route prior to the job section to be processed is identical has a priority in the identifying. Thus, the effective classification having the correlation with the route prior to the job section to be processed is extracted, preferentially.

Incidentally, the aforementioned predetermined condition may include a condition of a job to be included in the process instance. The constraint condition may be used as the predetermined condition to narrow the process instances.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

In addition, the business flow analysis apparatus 100 is a computer device as shown in FIG. 33. That is, a memory 2501 (storage device), a CPU 2503 (processor), a hard disk drive (HDD) 2505, a display controller 2507 connected to a display device 2509, a drive device 2513 for a removable disk 2511, an input device 2515, and a communication controller 2517 for connection with a network are connected through a bus 2519 as shown in FIG. 33. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program for causing a computer to execute a business flow analysis procedure, the business flow analysis procedure comprising:
    classifying specific process instances, each including a specific job section, among a plurality of process instances, each including a sequence of job names arranged in time series and time data of performed jobs, into a plurality of classifications, wherein the classifying comprises:
        first classifying the specific process instances among the process instances into each of process instances whose sequence of job names is completely identical; and
        second classifying the process instances classified at the first classifying into each of process instances whose route prior to the specific job section is identical;
    calculating, for each of the plurality of classifications, an average value and a standard deviation of transition periods that are differences between a start time and an end time of the specific job section in the specific process instances;
    identifying a classification of the specific process instances satisfying a predetermined condition that the standard deviation of the transition periods is less than a first threshold and whose average value of the transition periods or value calculated by adding the standard deviation to the average value of the transition periods is less than an average value of transition periods of all of the specific process instances, when a standard deviation of the transition periods for all of the specific process instances is greater than a second threshold, wherein a classification of the process instances whose route prior to the specific job section is identical has a priority in the identifying;
    comparing at least either of job or inter-job transitions, which are included in the specific process instance belonging to the identified classification, with at least either of jobs and inter-job transitions, which are included in the specific process instances belonging to classifications other than the identified classification, to extract at least either of a first feature job and a first feature inter-job transition, which are included in the specific process instance belonging to the identified classification, and at least either of a second feature job and a second feature inter-job transition, which are included in the specific process instances belonging to the classifications other than the identified classification; and
    outputting the extracted data to an output device.

2. A business flow analysis method, comprising:
    classifying, by a processor, specific process instances, each including a specific job section, among a plurality of process instances, each including a sequence of job names arranged in time series and time data of performed jobs, into a plurality of classifications among process instances stored in a process instance storage device, wherein the classifying comprises:
        first classifying the specific process instances among the process instances into each of process instances whose sequence of job names is completely identical; and
        second classifying the process instances classified at the first classifying into each of process instances whose route prior to the specific job section is identical;
    calculating, by the processor, for each of the plurality of classifications, an average value and a standard deviation of transition periods that are differences between a start time and an end time of the specific job section in the specific process instances;
    identifying, by the processor, a classification of the specific process instances satisfying a predetermined condition that the standard deviation of the transition periods is less than a first threshold and whose average value of the transition periods or value calculated by adding the standard deviation to the average value of the transition periods is less than an average value of transition periods of all of the specific process instances, when a standard deviation of the transition periods for all of the specific process instances is greater than a second threshold, wherein a classification of the process instances whose route prior to the specific job section is identical has a priority in the identifying;
    comparing, by the processor, at least either of job or inter-job transitions, which are included in the specific process instance belonging to the identified classification, with at least either of jobs and inter-job transitions, which are included in the specific process instances belonging to classifications other than the identified classification, to extract at least either of a first feature job and a first feature inter-job transition, which are included in the specific process instance belonging to the identified classification, and at least either of a second feature job and a second feature inter-job transition, which are included in the specific process instances belonging to the classifications other than the identified classification; and
    outputting the extracted data to an output device.

3. A business flow analysis apparatus, comprising:
a processor;
a unit to classify specific process instances, each including a specific job section, among a plurality of process instances, each including a sequence of job names arranged in time series and time data of performed jobs, into a plurality of classifications, wherein the classifying comprises:

first classifying the specific process instances among the process instances into each of process instances whose sequence of job names is completely identical; and second classifying the process instances classified at the first classifying into each of process instances whose route prior to the specific job section is identical;

a unit to calculate, for each of the plurality of classifications, an average value and a standard deviation of transition periods that are differences between a start time and an end time of the specific job section in the specific process instances;

a unit to identify a classification of the specific process instances satisfying a predetermined condition that the standard deviation of the transition periods is less than a first threshold and whose average value of the transition periods or value calculated by adding the standard deviation to the average value of the transition periods is less than an average value of transition periods of all of the specific process instances, when a standard deviation of the transition periods for all of the specific process instances is greater than a second threshold, wherein a classification of the process instances whose route prior to the specific job section is identical has a priority in the identifying;

a unit to compare at least either of job or inter-job transitions, which are included in the specific process instance belonging to the identified classification, with at least either of jobs and inter-job transitions, which are included in the specific process instances belonging to classifications other than the identified classification, to extract at least either of a first feature job and a first feature inter-job transition, which are included in the specific process instance belonging to the identified classification, and at least either of a second feature job and a second feature inter-job transition, which are included in the specific process instances belonging to the classifications other than the identified classification; and a unit to output the extracted data.

\* \* \* \* \*

UNITED STATES PATENT AND TRADEMARK OFFICE
CERTIFICATE OF CORRECTION

| | | |
|---|---|---|
| PATENT NO. | : 8,244,570 B2 | Page 1 of 1 |
| APPLICATION NO. | : 12/987570 | |
| DATED | : August 14, 2012 | |
| INVENTOR(S) | : Katsuhisa Nakazato | |

It is certified that error appears in the above-identified patent and that said Letters Patent is hereby corrected as shown below:

Column 15, Line 63, In Claim 1, delete "job or" and insert -- jobs and --, therefor.
Column 16, Line 45, In Claim 2, delete "job or" and insert -- jobs and --, therefor.
Column 18, Line 5, In Claim 3, delete "job or" and insert -- jobs and --, therefor.

Signed and Sealed this
Eighth Day of January, 2013

David J. Kappos
*Director of the United States Patent and Trademark Office*